United States Patent Office 3,794,707
Patented Feb. 26, 1974

3,794,707
PRODUCTION OF REFRACTORY ARTEFACTS
John Sidney O'Neill, Abingdon, and Calvin Eric Silverstone, Reading, England, assignors to United Kingdom Atomic Energy Authority, London, England
No Drawing. Continuation of abandoned application Ser. No. 812,396, Apr. 1, 1969. This application Aug. 23, 1971, Ser. No. 174,143
Claims priority, application Great Britain, Apr. 3, 1968, 16,047/68; June 19, 1968, 29,296/68; Oct. 25, 1968, 50,888/68
Int. Cl. C04b 33/32
U.S. Cl. 264—56                                         4 Claims

ABSTRACT OF THE DISCLOSURE

A refractory artefact is made by taking a mix of a refractory powder with a binder or binder mixture having plastic and setting properties; forming a green artefact from the mix, e.g. by making and laying up sheets; curing the setting binder, e.g. by heat, to form a hard cured artefact; machining if necessary and then heating to sinter the artefact. The sintering step may include nitriding.

BACKGROUND OF THE INVENTION

This application is a continuation of Ser. No. 812,396 filed Apr. 1, 1969 and now abandoned.

The present invention relates to the production of refractory artefacts. The term "refractory" is used herein in a wide sense to define materials which may be obtained in a powdered form and then sintered to give a final artefact. As is conventional, the term includes ceramic materials and metals, but the term should also be understood to include glass insofar as glass powder is capable of being sintered.

In the preparation of refractory articles by the conventional pressing and sintering techniques, it is difficult to form complex shapes. If machining is necessary to form the shape, the sintered artefact is often very hard whilst the green, i.e. unsintered, pressing is often too fragile. The pressing operation itself will only form relatively simple shapes.

OBJECT OF THE INVENTION

An object of the present invention is to provide a new or improved method for the production of refractory artefacts.

SUMMARY OF THE INVENTION

The present invention provides a method for the production of a refractory artefact comprising: providing a mix comprising a powder of a sinterable refractory material and polyvinyl butyral having thermoplastic and setting properties, shaping said mix into a green artefact under conditions in which the said thermoplastic properties are provided by the binder, curing the shaped artefact including said binder having setting properties to set the binder and to form a cured artefact from the green artefact, further shaping the cured artefact by machining, heating the shaped artefact to volatilize the organic binder material and subsequently sintering the artefact.

The said refractory material may be a glass, such as petalite or a borosilicate or lithium alumino-silicate glass; a technical ceramic, such as porcelain or a lithium aluminosilicate ceramic; a pure oxide ceramic, such as alumina or zirconia; a carbide ceramic, such as tungsten or silicon carbide; or a metal such as silicon, nickel or stainless steel. The techniques of sintering all these refractory materials are well known. The powder of the refractory material should be fine, e.g. less than 325 mesh B.S.S., to facilitate sintering.

The mix may be shaped into a sheet and said green artefact provided by uniting a plurality of said sheets.

The invention further provides a method for the production of silicon nitride artefacts comprising: making up a mix comprising silicon powder, at least one organic binder having thermoplastic and setting properties, shaping said mix into a green artefact under conditions in which the said thermoplastic properties are provided by the binder, curing the green artefact including said binder having setting properties to set said binder and form a cured artefact from said green artefact, further shaping the cured artefact by machining, heating the shaped artefact to volatilize the organic binder material and subsequently sintering the artefact in a nitrogen atmosphere, whereby the silicon artefact is simultaneously nitrided.

The function of the thermoplastic binder is to give coherence to the green artefact and when this is in the form of a sheet, a measure of flexibility is achieved. It should also soften by the application of heat to permit the green artefact to be formed or re-formed as will hereinafter be explained in detail. Polyvinyl acetate is a suitable thermoplastic binder.

The function of the setting binder is to cure and be rigid at temperatures at which the thermoplastic binder is losing its strength, e.g. 100–200° C., so as to give a rigid cured artefact which will not deform during the sintering process and is a faithful reproduction of the green artefact. The cured artefact is machined as necessary, e.g. it may be sawn, drilled or milled, as though it were a loaded resin and holes, slots, grooves or the like may readily be produced. A suitable setting binder is an acrylic resin, e.g. an acrylic-epoxy copolymer.

Desirably the setting binder will be thermosetting, but setting may be induced other than thermally, e.g. by a catalyst or radiation.

It is preferred to use a single material having both thermoplastic and thermosetting properties in place of the two separate binders above described and such a material is polyvinyl-butyral.

The invention further provides a method for the production of silicon nitride artefacts comprising making up a slurry containing silicon powder, an organic binder having thermoplastic and setting properties, and a solvent therefor, forming said slurry into sheets, laying up said sheets to form a green artefact, curing the green artefact including said binder having setting properties to set said binder and form a cured artefact from said green artefact, shaping the cured artefact by machining, heating the shaped artefact to volatilize the organic binder material, and subsequently sintering the artefact in a nitrogen atmosphere, whereby the silicon artefact is simultaneously nitrided.

The binder or binders may need to be dissolved in a suitable solvent, e.g. methyl ethyl ketone, prior to mixing with the refractory material, and a plasticizer, e.g. dibutyl phthalate, may be desirable. Alternatively a high energy mixing process such as takes place in a "Banbury" machine may be used, in which case solvents are not essential.

Sheets may be made by calendering or by roller coating or by a doctor blade technique on a suitable carrier, e.g. silicone-coated paper. In practicing the doctor blade technique, the carrier is pulled under a trough containing the solvent based mix and the thickness of the deposited sheet, e.g. 0.005" to 0.125", is adjusted by a doctor blade. The solvent is allowed to evaporate from the sheet which may then be removed from the carrier. If thicker sheets are required, additional coats may be applied to the sheet after it has been formed on the carrier.

If it is desired to provide either a reinforced or a porous refractory artefact this may be done. Thus in order to produce a reinforced artefact, reinforcing whisker, e.g. of alumina, silicon nitride or silicon carbide, or short lengths of fibres, e.g. carbon fibres, are included in the mix and incorporated in a random manner in the sheet. If it is desired to incorporate aligned reinforcement to give directional properties to the sheet, a comb may be mounted adjacent to the doctor blade to align the fibres or whiskers as they pass through it. Alternatively it may be desired to incorporate long lengths of fibres and this can be achieved by pulling a tow of such fibres through the trough and under the doctor blade; conveniently the tow is attached to the front of the carrier. By these techniques it is possible to incorporate 10 to 50% by volume of reinforcement.

If it is desired to produce an artefact with controlled ducts, the fibers, e.g. of carbon, cellulosic or other organic material, are burnt out during a subsequent stage.

The properties of sheet and block in the green state may be enhanced by densification either by roll-compacting or pressing. On rolling, there is initial densification without extension but further densification is accompanied by longitudinal and a little transverse extension; a limit is thus set to densification by the friction conditions in the roll-gap. In die-pressing, densification increases with applied load; pressing between platens is intermediate in effect between the previous methods.

In the case of alumina and similar sintered materials, the green state compaction improves sinterability and reduces sintering contractions and deformation.

In the case of silicon nitride, compaction of the green silicon sheet leads to increased density after nitriding with associated increase in strength as follows:

|  | Density (gm. cm.³) | Bend strength (p.s.i.) |
| --- | --- | --- |
| Uncompacted | 1.8 | 15,000 |
| Compacted | 2.5 | 45,000 |

Sheet may be produced by calendering material derived from either a solvent mix or solvent-free mix from Banbury mixing. This latter process is best followed by an extrusion operation to provide a suitable feed to the calender or similar hot rolling machine.

The sheet produced as above described is strong and easily handled and may be used to produce shapes by punching and blanking operations. The sheet may be readily formed, especially if heated, and may be assembled into more complex shapes by causing sheets to adhere together by pressing with the application of a little solvent or solvent based refractory mix.

A difficulty may arise if the green artefact is very complex and a large number of thin sheets have to be laid up as the solvent or binder may cause softening of the sheets. Under these circumstances, it is found advantageous to use an adhesive which does not contain a solvent for the binder, e.g. a water-based adhesive such as polyvinyl acetate emulsion or an aqueous solution of polyvinyl alcohol. The adhesive mix may also contain the refractory material of the sheets.

After forming a green artefact in this way, it is then cured, e.g. by heating, to harden the setting resin and produce a rigid cured artefact.

The artefact may increase in strength by a factor of about 3 on curing at 100–200° C. Bend strength has been measured as follows:

|  | P.s.i. |
| --- | --- |
| Precure | 1000 |
| Postcure | 3000 |

Uncured sheets and Banbury prepared mixes may be granulated or shredded and used as feed for compaction or extrusion shaping processes, the products of which (after curing) are, according to the invention, machined by conventional machining techniques.

The next stage is to sinter the cured artefact. Due to the thermosetting properties of the binder, extended sheet fabrications become self-supporting both at normal temperatures and through the early stages of sintering. It may however be desirable to heat very slowly at the start of the sintering stage, e.g. up to 400° C., so that the organic components are removed in a progressive manner without causing excessive porosity or cracking. In the case of oxide ceramics, e.g. alumina, the sintering is continued by heating to a temperature of about 1400° C. to 1750° C. in a suitable atmosphere. In the case of a stainless steel artefact, a reducing atmosphere, e.g. hydrogen, is necessary in sintering and temperatures of about 1300° C. are required. In the case of a silicon nitride artefact which is conveniently made from silicon as the raw material, the sintering operation is combined with a nitriding operation in a nitrogen atmosphere and for example two to four hours at 1350° C. followed by two hours at 1450° C. gives complete conversion to silicon nitride for thin sections. Longer heating is necessary for thick sections. In spite of the relatively high binder content, e.g. up to 25% by volume, the dimensional change between the cured artefact and the final product is small, e.g., 0.3% in the case of silicon nitride.

By the choice of a suitable binder and solvent concentration, it is possible to produce a mix which can be spun to form a tangled mass of fibres. During curing these fibres will ahere where they touch and subsequent sintering or nitriding will produce a fibrous artefact, which may for example be used as an insulant.

During the sintering or nitriding operation sintering or nitride formation respectively takes place across the bonds made during fabrication and after the sintering or nitriding is completed no trace of these bonds can be found. Thus the final artefact can be considered to be a unitary body, although it will be understood that any reinforcement will not extend across a bond.

DESCRIPTION OF THE PREFERRED EMBODIMENT

In order that the present invention may more readily be understood, one embodiment of the same will now be described by way of example. In this embodiment, the invention is applied to the manufacture of a regenerative heat exchanger disc of silicon nitride.

Using a ball mill, commercial grade silicon powder was wet milled in methyl ethyl ketone, e.g. for 18 hours, to break up agglomerates and reduce the powder to smaller than 325 mesh B.S.S. The ball mill was then used to mix in the binder and plasticizer to produce the following slurry:

| Silicon | kg | 2 |
| --- | --- | --- |
| Polyvinyl-butyral (binder) | g | 200 |
| Dibutyl phthalate (plasticizer) | ml | 150 |
| Methyl ethyl ketone (solvent) | ml | 1200 |

This slurry was then loaded into a trough having its base closed by a silicone-coated paper carrier strip. The carrier was pulled under the bottom of the trough and under a doctor blade to deposit a layer of the mix on the carrier. This layer was dried by the evaporation of the solvent to give a sheet 0.008 inch thick. The sheet was then removed from the carrier.

The sheet was then passed between corrugating rolls, heated to 45° C., to impart corrugations of pitch 0.133" and amplitude 0.044", and this corrugated sheet was passed with a plane sheet between a corrugated and a plain roll to adhere the two sheets together under the influence of heat and pressure.

The resulting double sheet was edge trimmed and the plane side coated with a thin layer of an aqueous solution of polyvinyl alcohol containing 30% by weight of milled silicon as an adhesive. It was then rolled up to form a green heat exchanger disc, 3" thick and 6" in diameter.

The green artefact was now heated slowly to 200° C. in air over 3 hours and held at that temperature for a further hour. This treatment caused the binder to harden and the cured artefact was then ground on its faces to true it up.

The cured artefact was then placed in a nitriding furnace containing an atmosphere of nitrogen and heated according to the following schedule:

| Temperature range, °C.: | Time (mins.) | Comments |
|---|---|---|
| 20–200 | 30 | |
| 200–450 | 200 | Debonding. |
| 450–1,200 | 300 | No control necessary. |
| 1,200–1,350 | 150 | |
| 1,350 | 200 | Initial nitriding. |
| 1,350–1,450 | 100 | |
| 1,450 | 120 | Final nitriding. |

The final artefact was substantially entirely silicon nitride.

What is claimed:

1. A method for the production of a refractory artefact comprising: providing a mix comprising a powder of a sinterable refractory material and polyvinyl butyral having thermoplastic and thermosetting properties, shaping said mix into green artefact under conditions in which said thermoplastic properties are provided by the binder, heating the shaped artefact including said binder having thermosetting properties to set the binder to be rigid at temperatures at which the thermoplastic binder loses its strength and to form a cured artefact from the green artefact, further shaping the cured artefact by machining, heating the shaped artefact to volatilize the thermoset polyvinyl butyral binder material, and subsequently sintering the artefact.

2. A method according to claim 1 wherein said mix is shaped into a sheet and said green artefact is provided by uniting a plurality of said sheets.

3. A method for the production of silicon nitride artefacts comprising making up a slurry containing silicon powder, an organic resin binder having thermoplastic and thermosetting properties, and a solvent therefor, forming said slurry into sheets, laying up said sheets while said thermoplastic properties are provided by the binder to form a green artefact, curing the green artefact including said binder having thermosetting properties to set said binder to be rigid at temperatures at which the thermoplastic binder loses its strength and to form a cured artefact from said green artefact, shaping the cured artefact by machining, heating the shaped artefact to volatilize the organic binder material and subsequently sintering the artefact in a nitrogen atmosphere, whereby the silicon artefact is simultaneously sintered and nitrided.

4. A method according to claim 3 wherein the binder is polyvinyl butyral.

References Cited

UNITED STATES PATENTS

| 2,966,719 | 1/1961 | Park, Jr. | 264—63 |
| 3,320,044 | 5/1967 | Cole et al. | 264—63 |

FOREIGN PATENTS

| 951,681 | 3/1964 | Great Britain | 264—63 |
| 285,005 | 10/1965 | Australia | 264—65 |
| 745,546 | 11/1966 | Canada | 264—65 |
| 472,110 | 9/1937 | Great Britain | 264—63 |
| 753,643 | 7/1956 | Great Britain | 264—67 |

OTHER REFERENCES

James J. Thompson, "Forming Thin Ceramics," September 1963, Ceramic Bulletin at 480–481.

A. T. Teter, "Binders for Machinable Ceramics," Ceramic Age, August 1966 at pp. 30–32.

DONALD J. ARNOLD, Primary Examiner

U.S. Cl. X.R.

264—63, 65, 67